Feb. 27, 1968  K. SCHWARZROCK  3,370,999
METHOD AND APPARATUS FOR MANUFACTURING
REINFORCED MULTILAYER FILMS
Filed Nov. 13, 1963  3 Sheets-Sheet 1

Inventor:
KARL SCHWARZROCK
By Burgess, Dinklage & Sprung
ATTORNEYS

United States Patent Office 3,370,999
Patented Feb. 27, 1968

3,370,999
METHOD AND APPARATUS FOR MANUFACTURING REINFORCED MULTILAYER FILMS
Karl Schwarzrock, Lohmar, near Cologne, Germany, assignor to Willy Muller
Filed Nov. 13, 1963, Ser. No. 323,532
6 Claims. (Cl. 156—172)

Known films made up of several layers have the disadvantage of insufficient strength and supporting capacity.

It has already been proposed to reinforce flat films by intermediate fabric nets by calendering. However, this is only possible with films of a limited width as calender trains with broader width are extraordinarily expensive. It has further been proposed (U.S. Patent 2,810,424) to reinforce plastic tubes or hoses by a reinforcing liner. By this known method, however, it is not possible to make an extruded tubular film which is then expanded by inflation, nor is it possible to make a multilayer expanded film. It is further known (U.S. Patent 2,513,106) to reinforce a tube or hose by insertion of a wire.

The invention refers to a new method to reinforce a multilayer expanded film with a great diameter and with unlimited length in a single working operation.

According to the invention a tube or hose film is extruded and expanded by inflation to a desired diameter and then a plurality of threads are wound around the tube or hose and over these threads at least one further tube or hose film is extruded.

The method will be further described with reference to the accompanying drawings showing an installation for carrying out the method.

Figure 1:
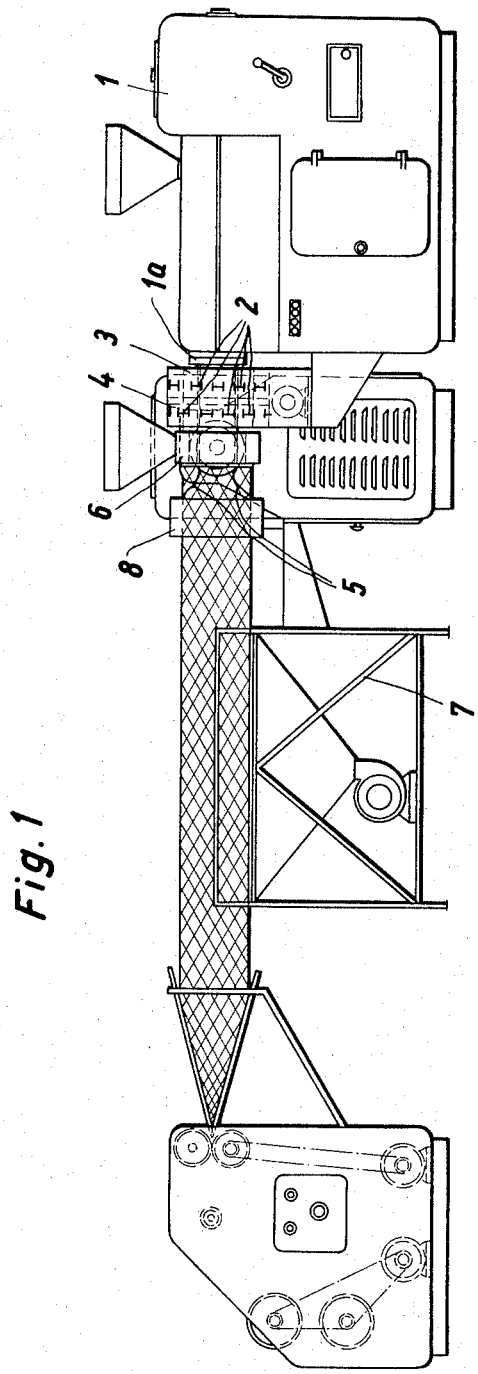
Figure 2:
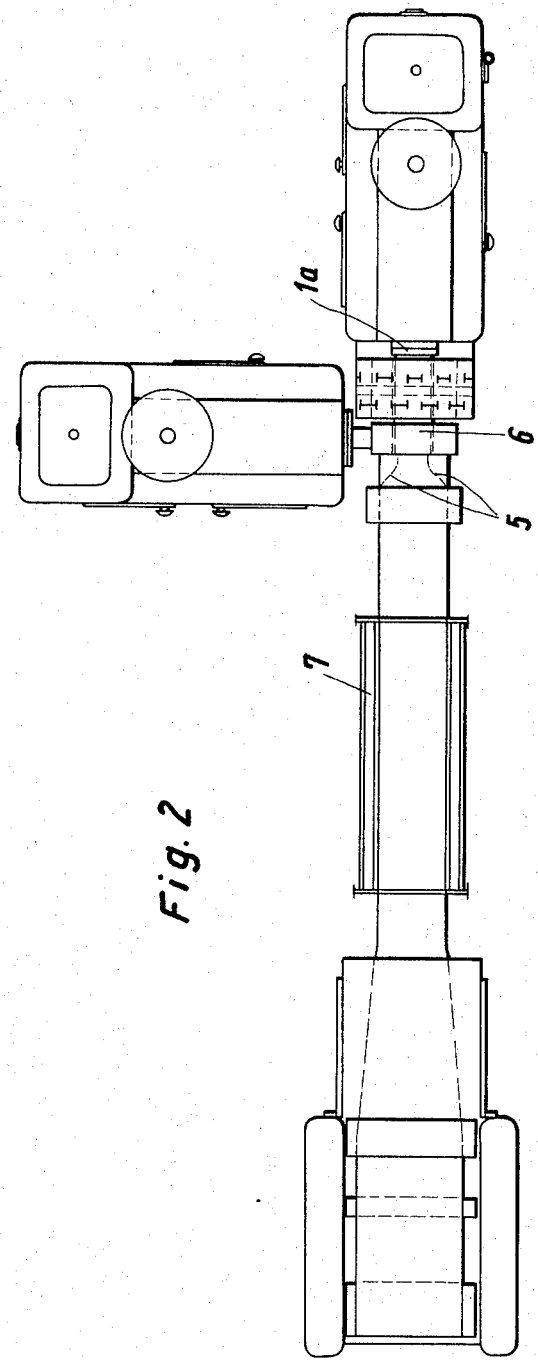
Figure 3:
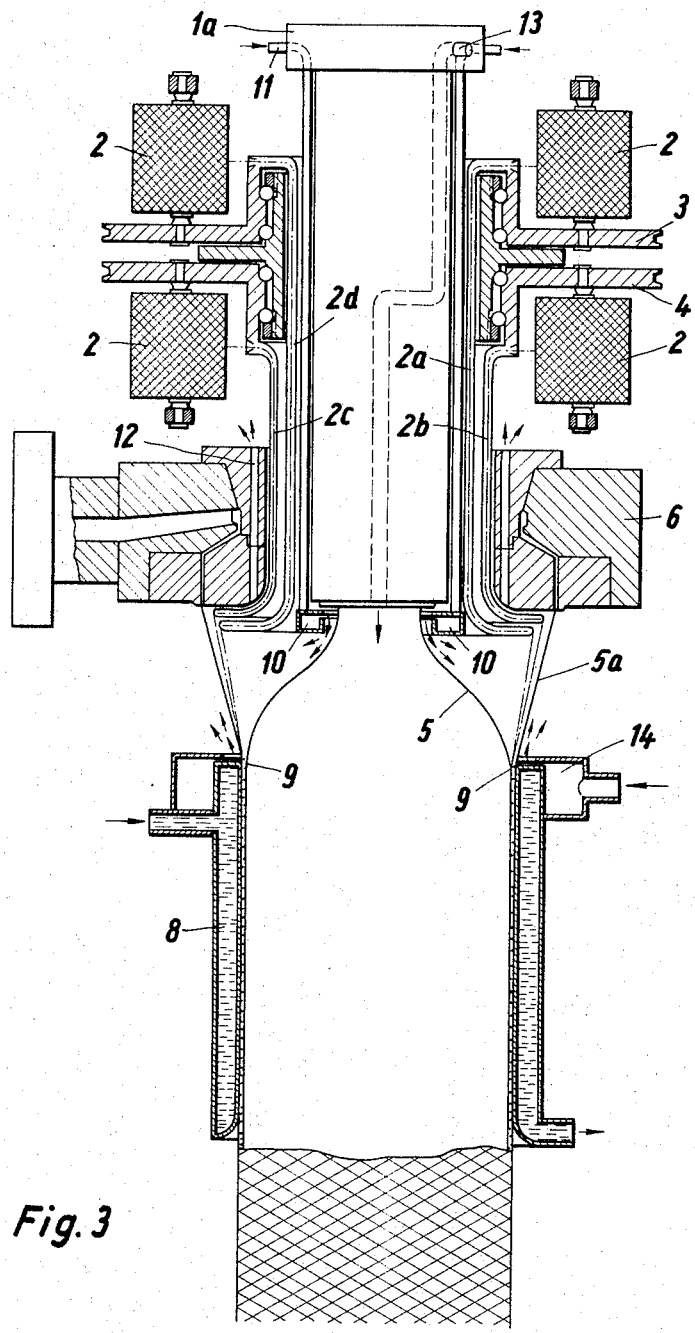

FIG. 1 is a diagrammatical side elevation of a complete plant,
FIG. 2 is a top view of the plant of FIG. 1,
FIG. 3 is a longitudinal cross section of the plant.

In FIG. 1 an apparatus 1 for inflating an extruded film tube has an extrusion head 1a from which a first tube 5 issues. A ring 10 for cooling air is provided where the first tube 5 leaves the extrusion head 1a. A conduit 11 admits cooling air to the ring 10. In a second extrusion head 6 conduits 12 are provided which draw off cooling air. A conduit 13 admits the compressed air which inflates the tube.

Two rotating thread-bobbin holders 3, 4 are located rotatably around the extrusion head 1a. The thread bobbins 2 are mounted in ball bearings of the bobbin holders, and the thread bobbins are driven in opposite direction by an infinitely variable gear.

The thread guides 2a–d of the bobbin holders 3, 4 admit the reinforcing threads to the point 9 where both tube films 5 and 5a are heat-sealed.

By the rotation of the bobbin-holders 3, 4 with the thread guides 2a–d in opposite directions the first tube film is covered with a net-like thread reinforcement. The threads may be plastic-, textile-, glass- or metal-threads.

Behind the bobbin holders a second extrusion head 6 is arranged from which the second tube film 5a issues, which surrounds the first tube film reinforced by the net-like threads. At the point 9 both tube films are heat-sealed whereby the reinforcement is completely embedded.

As the bobbin holders are rotated in opposite directions any twisting of the films 5, 5a is impossible.

The thread guides may be adjusted axially and biaxially and thus may be adapted to the zone in which both films are heat-sealed.

By the infinitely varied speed of the bobbin holders the mesh-size of the net-like reinforcement can be adjusted, and by varying the number of the thread bobbins the tightness of the reinforcement can be adjusted depending upon the size of the film.

The method of the invention enables also the manufacture of a reinforced compound film consisting of two different materials as the two screw-type extruders may be used with different thermoplastic materials which are extruded at different temperatures.

Behind the second extrusion head 6 and at the point 9, where both films 5, 5a embedding the reinforcing threads are heat-sealed, a ring 14 for cooling air is located, by which the second film 5a is cooled, and also a counter pressure ring 8 to counteract the internally applied sealing pressure. With a horizontal arrangement of the installation there is provided a film carrier 7 between the pull-off and the reeler, and this carrier by means of an air cushion prevents a sagging of the sealed film and said cushion simultaneously cools the film. It is important to prevent the film from sagging since this would effect the manufacture adversely and result in uneven films.

The instalment also can be arranged in a vertical direction as shown in FIG. 3 and such arrangement is to be preferred with greater sizes of reinforced compound films.

What is claimed as new and desired to be secured by Letters Patent is:

1. Apparatus which comprises concentric tubular extrusion means; rotatable fiber delivery means between said extrusion means and substantially adjacent thereto; rotatable fiber supply means operatively associated with said delivery means positioned outside the largest diameter extrusion means; means for introducing fluid pressure inside the smallest diameter extrusion means; and means for rotating said fiber supply and delivery means.

2. Apparatus as claimed in claim 1 wherein a multiplicity of thread supply and delivery means are provided.

3. Apparatus as claimed in claim 1 wherein cooling means are provided operatively associated with said extrusion means whereby to cool the extrusion product.

4. Apparatus as claimed in claim 1, including means for axially drawing a larger diameter tube produced by said extrusion means and means for radially expanding a smaller diameter tube produced by said extrusion means.

5. Apparatus as claimed in claim 4, including means for causing said larger and smaller diameter tubes to contact each other after initiation of said drawing and means for inserting fiber from said fiber delivery means in the nip of said tube contact.

6. Method of manufacturing a 2-layer, infinite length, tubular film having fibrous reinforcement between layers thereof which comprises simultaneously, concentrically extruding two tubular films; providing a plurality of substantially continuous fibers wound around between said concentric tubes; and causing said extruded tubular films to contact each other by the application of fluid pressure inside the innermost of said two concentric films and to fuse together substantially on said contact; feeding substantially continuous fiber from fiber delivery means into the nip of said contacting tubular films, and rotating said fiber delivery means concentric with and between said extruding tubular films whereby said fiber forms at least one substantial helix between said tubes.

References Cited

UNITED STATES PATENTS

| 2,491,152 | 12/1949 | Beidle | 156—393 |
| 2,753,596 | 7/1956 | Bailey | 156—156 |
| 2,932,323 | 4/1960 | Aries | 156—244 X |
| 3,132,986 | 5/1964 | Goldman | 156—427 |
| 3,157,544 | 11/1964 | Lichtey | 156—148 |

EARL M. BERGERT, *Primary Examiner.*
J. P. MELOCHE, *Assistant Examiner.*